Nov. 11, 1958 W. KLOTZ 2,859,813
SHEET CUTTING APPARATUS
Filed Nov. 21, 1955 4 Sheets-Sheet 1

*Inventor:*
Wilhelm Klotz
By: Michael S. Struker
agt.

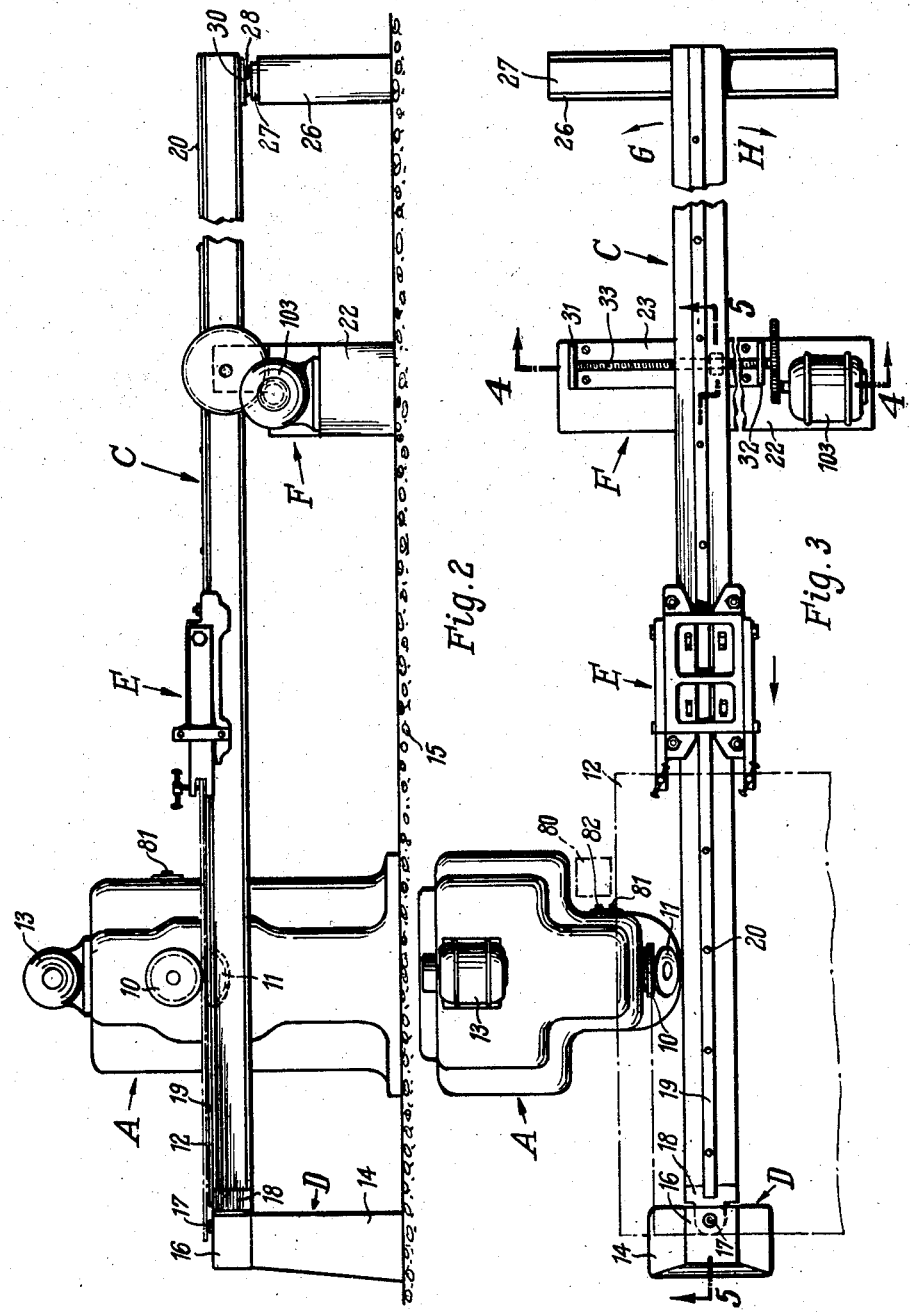

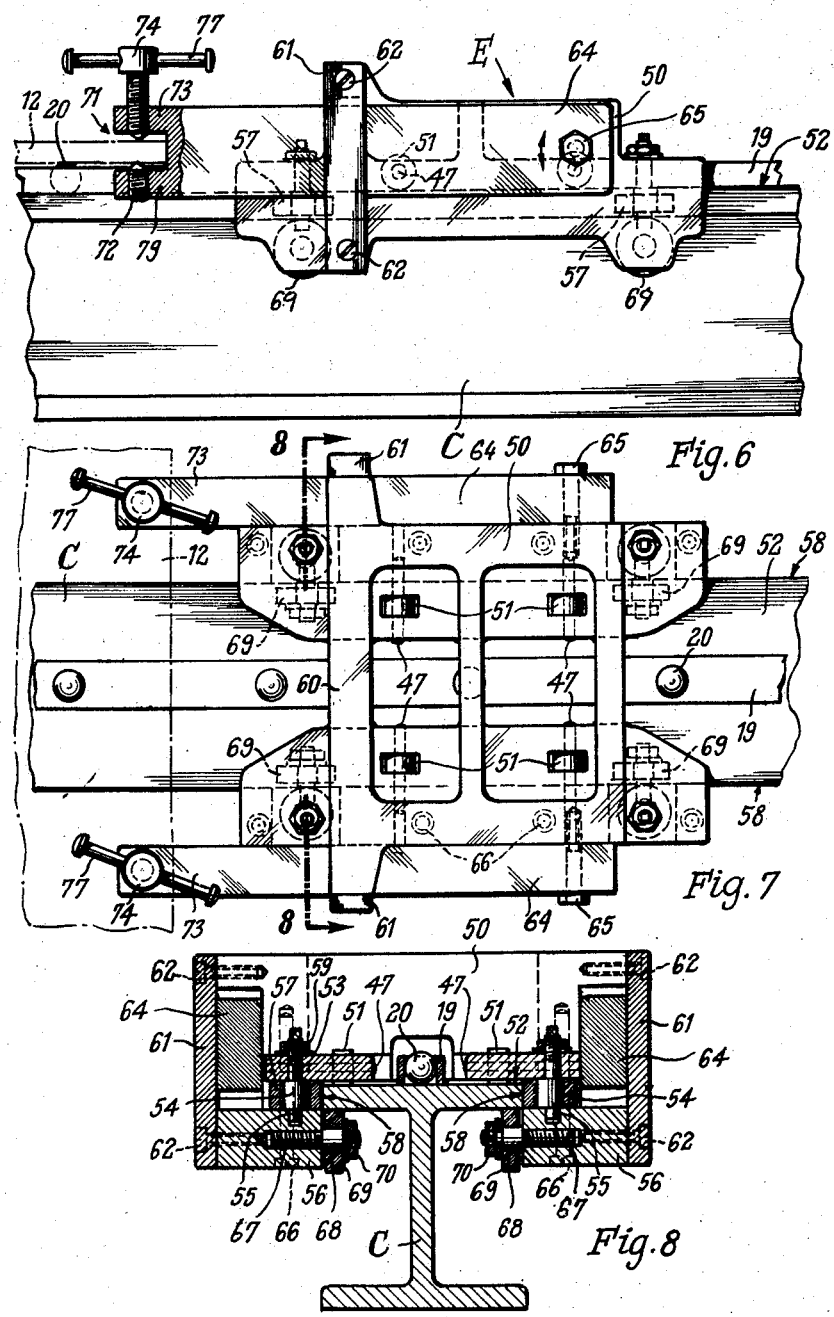

United States Patent Office 2,859,813
Patented Nov. 11, 1958

2,859,813

SHEET CUTTING APPARATUS

Wilhelm Klotz, Stuttgart, Germany

Application November 21, 1955, Serial No. 548,207

Claims priority, application Germany December 11, 1954

24 Claims. (Cl. 164—62)

The present invention relates to sheet cutting apparatus, and more particularly to a sheet cutting apparatus for cutting thick metal sheets.

It is known to cut metal sheets by a pair of rotating cutting means which simultaneously cut and transport the sheet. However, the arrangements according to the known art are incapable of cutting large, thick and heavy metal sheets or plates along a straight line within such small tolerances that the cut sheets can be automatically connected by welding along the cut edges as is particularly desirable in ship-building.

Thick metal sheets cut by the apparatus according to the known art are often warped by the cutting operation so that the cut edges have to be machined before the sheets are used. Due to these difficulties, heavy metal sheets are usually not cut by cutting blades, and autogenous torch cutters are used for this purpose. As is well known this operation is difficult and expensive, and requires finishing operations along the cut edges.

It is one object of the present invention to overcome the disadvantages of the known apparatus for cutting sheets, and to provide a sheet cutting apparatus capable of cutting a sheet in such manner that no finishing operations are required along the cut edges.

It is another object of the present invention to provide a cutting apparatus capable of cutting a heavy metal sheet along a marked line within small tolerances.

It is a further object of the present invention to provide a cutting apparatus whose cutting operation can be easily controlled either automatically or by an operator.

It is an important object of the present invention to provide a cutting apparatus in which sheet holding means are guided along guide means the position of which can be adjusted in a direction transverse to the cutting direction.

It is a further object of the present invention to provide a cutting apparatus in which the guide means of the sheet holding means are pivotally supported for turning movement in the plane of a sheet cut and transported by rotary cutting blade means.

It is also an object of the present invention to provide a cutting apparatus which can be so accurately controlled that precise cuts can be made along straight or curved lines.

With these objects in view, the present invention mainly consists in a sheet cutting apparatus comprising, in combination, cutting and transporting means for a sheet; sheet holding means for holding a sheet cut and transported by the cutting and transporting means; a guide means supporting the sheet holding means and guiding the same for movement in one direction; supporting means supporting the elongated guide means for movement in opposite directions transverse to said one direction; and operating means for selectively moving the elongated guide means in the opposite transverse directions to compensate for deviations of the cutting and transporting means from a cutting line on a sheet held by the sheet holding means.

The elongated guide means is preferably mounted at one end thereof for pivotal movement about an axis extending perpendicular to the plane of a sheet held by the sheet holding means, and the operating means act on the guide means at a point spaced from the pivot axis a greater distance than the cutting and transporting means and the sheet holding means. The sheet holding means are preferably located rearwardly of the cutting and transporting means in cutting direction so that the cut and transported sheet moves sheet holding means toward the pivot axis of the guide means.

In a preferred embodiment of the present invention an automatically braked motor drives the operating means and is controlled by electric control means. Such electric control means are either manually operated, or automatically actuated by photo-electric devices when the cutting device deviates from the desired cutting line. The above used term "automatically braked motor" defines an electric motor which is provided with suitable means immediately stopping the rotation of the motor when the same is disconnected from the source of current.

It is possible to provide reversing means as part of the operating means, for instance a reversible gear transmission. However, it is preferred to use a reversible motor the direction of rotation of which can be reversed by control means for driving the operating means in opposite directions whereby the position of the guide means is adjusted.

In modified embodiments of the present invention, a photo-electric sensing device is used for automatically controlling the drive motor which drives the operating means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a side view of the apparatus shown in Fig. 1;

Fig. 3 is a plan view of the apparatus shown in Fig. 2;

Fig. 6 is a side view, partly in section, of a sheet holding device according to the present invention shown on an enlarged scale;

Fig. 7 is a plan view of the sheet holding device shown in Fig. 6;

Fig. 8 is a cross-sectional view taken on line 8—8 in Fig. 7;

Figure 1:
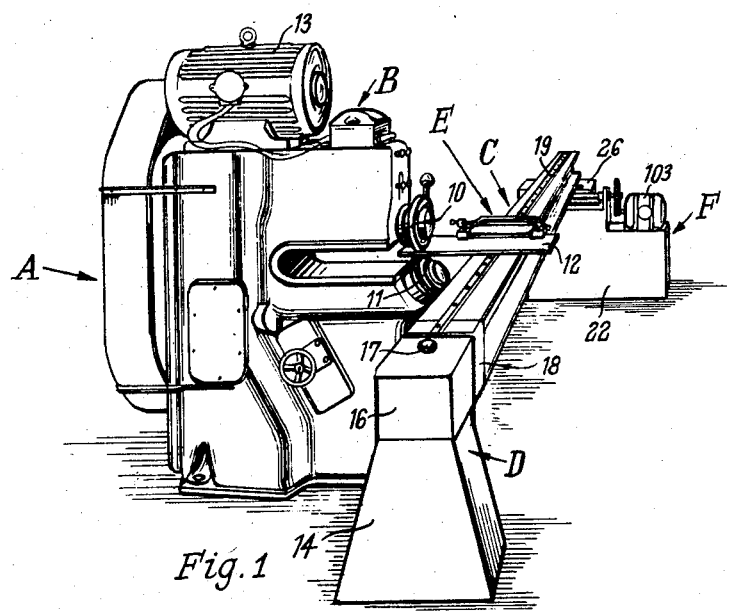
Fig. 1 is a perspective view of an embodiment of the sheet cutting apparatus according to the present invention.

Referring now to the drawings, and more particularly to Fig. 1, a sheet cutting machine A is arranged adjacent an elongaged guide means C which is turnably mounted on a support D for pivotal movement about a pivot means 17. A sheet holding means E is slidably guided on the guide means C and holds a sheet 12 which is cut by the cutting and transporting means 10, 11 of the cutting machine A and transported in the direction of the guide means C. In the illustrated embodiment, the cutting and transporting means are a pair of rotary blades. Operating means F including a motor 103 are connected to the guide means for pivoting the same about pivot means 17. The end of the guide means C is supported on a support 26 for movement in the plane of sheet 12. Rolling balls 20 facilitate the sliding of the sheet 12 on the guide means C. A control means B connected to motor 103 is mounted on the cutting machine A and is controlled by the operator in a manner which will be described hereinafter in greater detail.

Figure 5:
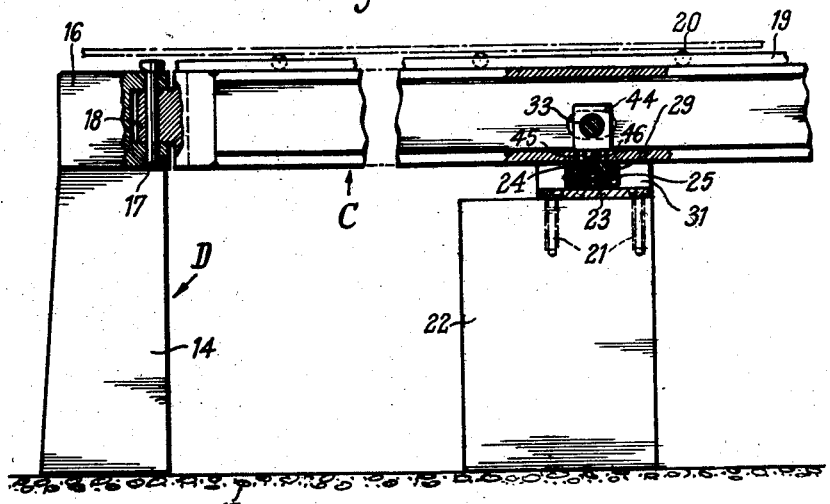
Fig. 5 is a cross-sectional view taken on line 5—5 of Fig. 3.

Referring now to Figs. 2, 3 and 5, one end of the elongated guide means C is pivotally mounted on a support 14 which is secured to the floor 15 and has a head portion 16. The head portion 16 is bifurcated and receives an end portion 18 of the guide means C. A pivot pin 17 passes through bores of the bifurcated portions of the head portion 16 and of the end portion 18. The pivot pin 17 is preferably attached to the head portion 16 in a press fit.

The guide means C is an I-beam, and a bar 19 is secured to the upper flange of the guide beam C and has a longitudinally extending groove means in which balls 20 are located which slightly project above the top surface of bar 19.

The other end of the guide means C is supported on a support 26 which is also fixedly secured to the floor 15. The top of support 26 carries a plate 27 which is fixedly attached thereto. A roller means 28, turnably mounted in a member 30 secured to the guide means C, rolls on the plate 27 when the guide means C is pivoted about the pivot means 17.

Figure 4:
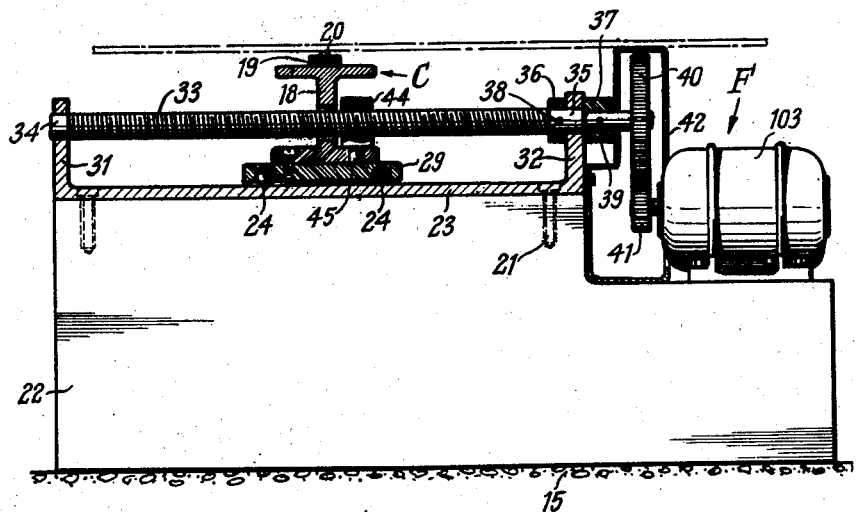
Fig. 4 is a cross-sectional view taken on line 4—4 of Fig. 2.

As best seen in Figs. 4 and 5, a further support 22 is arranged intermediate the supports 14 and 26 which is also fixedly secured to the floor. Support 22 carries at its top end a plate 23 which is fixedly connected to the support 22 by screws 21. Two rollers 24 are turnably mounted in ball bearings on pins 25 in a member 29 which is secured to the guide means C as best seen in Figs. 4 and 5. The plate 23 has at its end upturned flanges or brackets 31 and 32 which turnably support the cylindrical bearing portions 34 and 35 of a threaded spindle 33. Two annular members 36 and 37, are fixed by pins 38 and 39 to the threaded spindle 33 and prevent an axial movement of the threaded spindle 33. A gear 40 is fixed on the threaded spindle, and meshes with a pinion 41 which is mounted on the shaft of an electric automatically braking motor 103 which is fixedly secured to the support 22. A protective casing 42 houses the gear means 40, 41.

A threaded nut means 44 is threaded on the spindle 33 and carries a guide pin 45 which projects into a slot 46 provided in the lower flange of the supporting means C. The slot 46 is elongated in the direction of the longitudinal extension of the guide means C so that the nut means 44 can move relative to the guide means C during turning of the guide means C about a pivot means 18. This is necessary since the nut means 44 moves along a straight line defined by the axis of the spindle 33, while the slot 46 moves along a circle during turning movement of the guide means C.

It will be understood that rotation of the motor 103 in opposite directions will result in linear movement of the nut means 44 in opposite transverse directions with respect to the directions defined by the longitudinal extension of the guide beam means C. Transverse movement of the nut means 44 along the spindle 33 will effect turning of the guide beam means C about the pivot means 17 while the free end of guide beam means C moves over the support 26 on roller means 28.

The sheet holding means E will now be described with reference to Figs. 6, 7 and 8. In the main body 50 of the sheet holding device four rollers 51 are mounted turnable about shafts 47. The rollers 51 roll on the top surface 52 of the guide means C as best seen in Fig. 8.

A member 60 extends in transverse direction across the main body 50. Two lateral members 61 are secured to the ends of member 60 by screws 62. The main body 50 of the sheet holding means carries two holding members 64 which are secured by screws 65 to the main body and are arranged between the lateral members 61, respectively, and the main body 50 which is provided with cutouts for receiving the holding members 64. The holding members 64 project beyond the main body 50 and have bifurcated end portions 71, each end portion 71 including an upper portion 73 and a lower portion 79. A screw 74 is mounted in a threaded bore of each portion 73 and can be adjusted by a handle 77. In each lower portion 79, a screw 72 is provided which is coaxial with the screw 74 so that by turning of the handle 77, a sheet 12 can be clamped between the pairs of screws 72 and 74. As best seen in Fig. 7, two clamping means constituted by screws 72, 74 are provided for holding the sheet 12 in a working plane. The clamped sheet 12 is supported on rolling balls 20 which are mounted in the groove means of the previously described bar 19.

Two members 56 are secured by screws 62 to the lateral members 61, and by screws 66 to the main body 50. Threaded pins 77 are screwed into threaded bores of members 56 and turnably support rollers 68 which engage the lower face of the upper flange of the guide beam means C. Nut means 70 are threaded onto pins 67 and engage an enlarged portion 68 for holding the rollers 68 on pins 67.

Four pins 53 are secured to the main body 50 by nuts 53, each pin 53 having an end portion 55 and an eccentric portion 54. Two bearing recesses are provided in each of the members 56 for receiving the end portions 55 of the pins 53 so that the same can be turned after the nuts 59 have been loosened. Thereby the position of the eccentric portions 54 can be adjusted for adjusting the axes of the rollers 57 which roll on the lateral faces 58 of the top flange of the guide means C. The lateral faces 58 constitute guide means for guiding the sheet holding means E along the guide beam means C.

From the above description of the structure of the sheet holding means E it will be understood that the sheet holding means are guided for movement along the top face, the lower face and the lateral faces of the top flange of guide means C, these faces being respectively engaged by the rollers 51, 69, and 57. The eccentric means 53, 54 permit a particularly accurate adjustment of the sheet holding means E on the guide means C, which is of importance since the sheet holding means E should not have any transverse play on the guide means C.

The apparatus is operated in the following manner:

The sheet holding means E is moved away from the pivot means D and from the pair of driven rotary cutting blade means 10, 11 until there is room for placing a sheet 12 on the balls 20 on the top face of the guide means C between the cutting blade means 10, 11 and the clamping means 72, 74 of the sheet holding means E. The end of the sheet 12 is now clamped by the clamping means 72, 74 in a position in which a previously marked line on the sheet is exactly aligned with the cutting blade means 10, 11.

The cutting machine A is now started so that the cutting blade means 10, 11 cut the sheet along the marked line and transport the sheet simultaneously toward the supporting pivot means D. Since the sheet is rigidly held by the sheet holding means E, the sheet holding means E moves along the guide means C and toward the cutting blades 10, 11 which constitute cutting and transporting means. During such movement the sheet is also supported on the rolling balls 20 so that the entire sheet is located in a straight position in a working plane which extends normal to the axis of the pivot means D.

In the embodiment illustrated in Figs. 1 to 8, the machine is manually controlled, and an operator stands at the place 80 indicated in Fig. 3 adjacent the cutting machine so that the operator can observe the cut made along the marked line on the sheet. The control box B is operated by the control buttons 81 and 81 and is mounted on the cutting machine A. The control buttons 81 and 82 are connected by known circuits including a reversing switch means located in control box B of the electric motor 103 so that the operation of button 81 effects rotation of motor 103 in one direction, and operation of button 82 effects rotation of motor 103 in the opposite direction. Consequently, a spindle 33 is driven in opposite directions whereby the guide means C can be returned to a desired position by the operator in the event that cutting means 10, 11 deviate from the marked line on the sheet.

The arrangement is preferably such that operation of the left button 81 effects movement of the guide means C and of the sheet holding means E in the direction of the arrow H, and operation of the right button 82 effects movement of the guide means C in the direction of the arrow G. The motor 103 is an automatically braking motor which immediately stops when disconnected.

Due to the fact that lever arm of the operating means 33, 44 and 103 is longer than the lever arm of the cutting means 10, 11, the nut means 44 moves in transverse direction a greater distance to compensate for a smaller deviation of the cutting means 10, 11.

Figure 9:
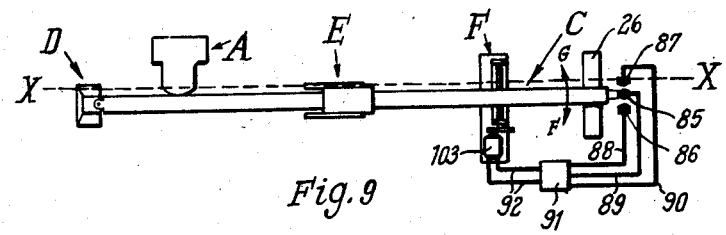
Fig. 9 is a schematic plan view of an automatically operated embodiment of the present invention.
Figure 10:
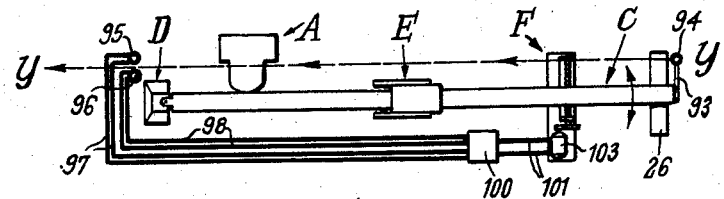
Fig. 10 is a schematic plan view of a modified automatically operated embodiment of the present invention.
Figure 11:
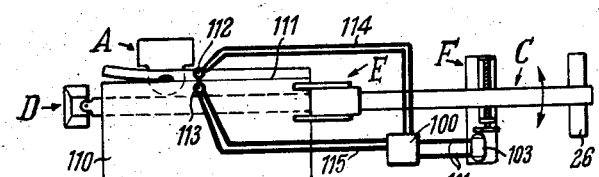
Fig. 11 is a schematic plan view of another modified automatically operated embodiment of the present invention.

Figs. 9, 10 and 11 illustrate modified embodiments in which the position of the guide means C is automatically adjusted. The supporting pivot means D, the cutting machine A including cutting and transporting means, the sheet holding means E, the operating means F, and the guide means C shown in Figs. 9 to 11 correspond to the arrangement described with reference to Figs. 1 to 8.

In the embodiment of Fig. 9, the free end of the guide beam means carries a contact member 85 which cooperates with two contacts 86 and 87 arranged on both sides of contact 85. Conductors 88, 89 and 90 connect the contacts 85, 86 and 87 to a control means 91 which is connected by conductors 92 to the motor 103. The broken line X—X indicates the direction of the desired cutting line which extends parallel to the line of symmetry of the guide means C and parallel to the guide faces 58 described with reference to Fig. 8 when contact 85 is in the illustrated intermediate position.

In the event that during the cutting operation the guide beam means C is displaced in a direction transverse to the cutting and transporting direction X—X, contact is made between the contacts 85 and 86, or contacts 85 and 87, respectively. A transverse displacement of the guide beam means for only one tenth of a millimeter at the cutting point may, for example, result in displacing contact member 85 one millimeter due to the greater distance of the contact member 85 from the pivot means 17, 18. The forces produced by the cutting means 10, 11 are so great that even very rigid beams are slightly displaced due to the inherent elasticity of metal. The control means 91 effect starting of motor 103 for rotation in one direction when the contact 85, 87 is closed, and starting of the motor 103 for rotation in the opposite direction when the contact 85, 86 is closed. Thereby, any deviation of the cutting means 10, 11 from the marked line on the sheet is automatically corrected. Since the motor 103 is a motor of the type which immediately stops when the contacts 85, 87 or 85, 86 break, the guide means C, the sheet holding means E, and the sheet held by the sheet holding means E are automatically maintained in the desired position.

In the embodiment shown in Fig. 10 the position of the guide beam means C is controlled by a photo-electric sensing device. The free end of the guide means C carries a transverse arm 93 on which the source of light 94 is arranged. The source of light 94 emits a beam of light Y—Y extending parallel to the direction of the guide beam means C when the same is in its normal position. Two stationary photo-sensitive cells 95 and 96 are connected by conductors 97 and 98 to a control means 100 which controls the motor 103 through conductors 101. Similar to the embodiment described with reference to Fig. 9 operation of the control means 100 effects starting of motor 103 for rotation in selected opposite directions.

In the event that the pressure of the cutting means slightly deforms the metal parts of the machine so that the guide means C moves out of its normal intermediate position in which the beam of light Y—Y passes between the photo-sensitive cells 95, 96, the beam of light energizes one of the photo-cells 95, 96, and the respective energized photo-cell operates the control means 100 which start motor 103 to rotate in such direction as to return the guide beam means C, the sheet holding means E, and the sheet to the desired position in which the cutting means cut exactly along the marked line on the sheet.

In the embodiment illustrated in Fig. 11, the sheet to be cut is designated by reference numeral 110 and has a single line 111 marked thereon along which the cut is to be made. The line 111 is marked in a color different from the color of the sheet 110, for instance in a white line. Above the sheet 110, and on both sides of the marked line 111, are arranged two photo-cells 112 and 113 which are connected by conductors 114 and 115 to a control means 100. The motor 103 is connected by conductors 101 to the control means 100 and is operated by the same in the manner described with reference to Fig. 10. If the line 111 is located intermediate the photo cells 112, 113 in the normal position of the beam, the photo cells 112, 113 are not energized.

In the event that the sheet 110 is displaced in transverse direction during the cutting operation, the marked line 111 moves under one of the photo-electric devices 112, 113 so that the respective photo-cell thereof is energized due to the increase of the intensity of the light reflected by the marked line 111 into the respective photo cell as compared with the light reflected by the other surface of the sheet 110 in the normal position of the beam when the line 111 is located intermediate the photo cells. The energized photo cell produces an impulse which actuates the control device 100 in known manner to operate the motor 103 for returning the guide beam means C into a position in which the marked line 111 is again located between the photo-electric devices 112 and 113, and the cut is made along line 111.

Fig. 11 shows a straight line 111, but it is also possible to use the embodiment of Fig. 11 for cutting along a curved line. It is also contemplated to mark on the sheet 110 two parallel lines located on both sides of the desired cutting line and uniformly spaced from the same. In this arrangement, photo-electric devices 112 and 113 sense these two lines, respectively, and are energized as previously described when these lines are displaced during the cutting operation. Since each of these lines is wider than the expected displacement of the sheet in transverse direction, one cell remains over a line while the other cell is located above the darker surface intermediate the two lines. During displacement in the other direction, the other cell remains over the associated line and remains energized. The corrective movement is controlled in accordance with which cell remains energized, and which cell becomes deenergized.

It will be understood that each of the elements described above, or two or more together, may also find a useful application in other types of sheet cutting apparatus differing from the types described above.

While the invention has been illustrated and described as embodied in a sheet cutting apparatus including a guide means for the sheet holding means and means for adjusting the position of the guide means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sheet cutting apparatus comprising, in combination, cutting and transporting means for cutting and transporting a sheet in one direction; sheet holding means for holding a sheet cut and transported by said cutting and transporting means; an elongated guide means extending substantially in said one direction supporting said sheet holding means and guiding the same for movement in said one direction so that said cutting and transporting means move said sheet holding means along said elongated guide means when cutting and transporting a sheet held by said sheet holding means; supporting means supporting said elongated guide means for movement in opposite directions transverse to said one direction; and operating means for selectively moving said elongated guide means in said opposite transverse directions to compensate for deviations of said cutting and transporting means from a cutting line on a sheet held by said sheet holding means.

2. A sheet cutting apparatus comprising, in combination, cutting and transporting means for cutting and transporting a sheet in one direction; sheet holding means for holding a sheet cut and transported by said cutting and transporting means; an elongated guide means extending substantially in said one direction supporting said sheet holding means and guiding the same for movement in said one direction so that said cutting and transporting means move said sheet holding means along said elongated guide means when cutting and transporting a sheet held by said sheet holding means; supporting means turnably supporting said elongated guide means for turning movement in opposite directions transverse to said one direction; and operating means for selectively moving said elongated guide means in said opposite transverse directions to compensate for deviations of said cutting and transporting means from a cutting line on a sheet held by said sheet holding means.

3. A sheet cutting apparatus comprising, in combination, cutting and transporting means for cutting and transporting a sheet in one direction; sheet holding means for holding a sheet cut and transported by said cutting and transporting means, said sheet holding means being located rearwardly of said cutting and transporting means in said one direction; an elongated guide means extending substantially in said one direction supporting said sheet holding means and guiding the same for movement in said one direction so that said cutting and transporting means move said sheet holding means along said elongated guide means and toward said cutting and transporting means when cutting and transporting a sheet held by said sheet holding means; supporting means supporting said elongated guide means for movement in opposite directions transverse to said one direction; and operating means for selectively moving said elongated guide means in said opposite transverse directions to compensate for deviations of said cutting and transporting means from a cutting line on a sheet held by said sheet holding means.

4. A metal sheet cutting apparatus comprising, in combination, cutting and transporting means for cutting and transporting a metal sheet in one direction; sheet holding means for holding in a working plane a metal sheet cut and transported by said cutting and transporting means, said sheet holding means being located rearwardly of said cutting and transporting means in said one direction; an elongated guide means extending substantially in said one direction supporting said sheet holding means and guiding the same for movement in said one direction so that said cutting and transporting means move said sheet holding means along said elongated guide means and toward said cutting and transporting means when cutting and transporting a metal sheet held by said sheet holding means; supporting means supporting said elongated guide means for movement parallel to said working plane in opposite directions transverse to said one direction; and operating means for selectively moving said elongated guide means in said opposite transverse directions to compensate for deviations of said cutting and transporting means from a cutting line on a metal sheet held by said sheet holding means.

5. A sheet cutting apparatus comprising, in combination, cutting and transporting means for cutting and transporting a sheet in one direction; sheet holding means for holding in a working plane a sheet cut and transported by said cutting and transporting means, said sheet holding means being located rearwardly of said cutting and transporting means in said one direction; an elongated guide means extending substantially in said one direction supporting said sheet holding means and guiding the same for movement in said one direction so that said cutting and transporting means move said sheet holding means along said elongated guide means and toward said cutting and transporting means when cutting and transporting a sheet held by said sheet holding means; supporting means turnably supporting said elongated guide means for turning movement parallel to said working plane in opposite directions transverse to said one direction and about an axis extending perpendicular to said working plane, said axis being located spaced from said cutting and transporting means in said one direction; and operating means for selectively moving said elongated guide means in said opposite transverse directions to compensate for deviations of said cutting and transporting means from a cutting line on a sheet held by said sheet holding means.

6. A metal sheet cutting apparatus comprising, in combination, cutting and transporting means for cutting and transporting a metal sheet in one direction; sheet holding means for holding in a working plane a metal sheet cut and transported by said cutting and transporting means, said sheet holding means being located rearwardly of said cutting and transporting means in said one direction; an elongated guide means extending substantially in said one direction supporting said sheet holding means and guiding the same for movement in said one direction so that said cutting and transporting means move said sheet holding means along said elongated guide means and toward said cutting and transporting means when cutting and transporting a metal sheet held by said sheet holding means; supporting means turnably supporting said elongated guide means for turning movement parallel to said working plane in opposite directions transverse to said one direction and about an axis extending perpendicular to said working plane, said axis being located spaced from said cutting and transporting means in said one direction; and operating means located rearwardly of said cutting and transporting means in said one direction and engaging said elongated guide means for selectively moving said elongated guide means in said opposite transverse directions to compensate for deviations of said cutting and transporting means from a cutting line on a metal sheet held by said sheet holding means.

7. A metal sheet cutting apparatus comprising, in combination, cutting and transporting means for cutting and transporting a metal sheet in one direction; sheet holding means for holding in a working plane a metal sheet cut and transported by said cutting and transporting means, said sheet holding means being located rearwardly of said cutting and transporting means in said one direction; an elongated guide means extending substantially in said one direction supporting said sheet holding means and guiding the same for movement in said one direction so that said cutting and transporting means move said sheet holding means along said elongated guide means when cutting and transporting a metal sheet held by said sheet holding means; supporting means turnably supporting said elongated guide means for turning movement parallel to said working plane in opposite directions transverse to said one direction and about an axis extending perpendicular to said working plane, said axis being located forwardly of said cutting and transporting means in said one direction; and operating means located rearwardly of said cutting and transporting means and of said sheet holding means in said one direction and engaging said elongated guide means for selectively moving said elongated guide means in said opposite transverse directions to compensate for deviations of said cutting and transporting means from a cutting line on a metal sheet held by said sheet holding means.

8. A metal sheet cutting apparatus comprising, in combination, a pair of driven cooperating rotary cutting blade means for cutting and transporting a metal sheet in one direction; sheet holding means for holding in a working plane a metal sheet cut and transported by said rotary cutting blade means; an elongated guide means extending substantially in said one direction supporting said sheet holding means and guiding the same for movement in said one direction so that said rotary cutting blade means move said sheet holding means along said elongated guide means when cutting and transporting a metal sheet held by said sheet holding means; supporting means turnably supporting said elongated guide means for turning movement in said working plane in opposite transverse directions transverse to said one direction and about an axis extending perpendicular to said working plane, said axis being located spaced from said rotary cutting blade means in said one direction; and operating means located rearwardly of said rotary cutting blade means in said one direction and engaging said elongated guide means for moving said elongated guide means in said opposite transverse directions to compensate for deviations of said rotary cutting blade means from a cutting line on a metal sheet held by said sheet holding means.

9. A metal sheet cutting apparatus comprising, in combination, a pair of driven cooperating rotary cutting blade means for cutting and transporting a metal sheet in one direction; sheet holding means for holding in a working plane a metal sheet cut and transported by said rotary cutting blade means; an elongated guide means extending substantially in said one direction supporting said sheet holding means and guiding the same for movement in said one direction so that said rotary cutting blade means move said sheet holding means along said elongated guide means when cutting and transporting a metal sheet held by said sheet holding means; supporting means turnably supporting said elongated guide means for turning movement in said working plane in opposite transverse directions transverse to said one direction and about an axis extending perpendicular to said working plane, said axis being located forwardly of said rotary cutting blade means in said one direction; and operating means including threaded nut means turnably mounted on said elongated guide means rearwardly of said rotary cutting blade means in said one direction, and a threaded spindle means threadedly engaging said threaded nut means and extending transverse to said elongated guide means, said threaded spindle means being turnable for moving said elongated guide means in said opposite transverse directions to compensate for deviations of said rotary cutting blade means from a cutting line on a metal sheet held by said sheet holding means.

10. An apparatus as claimed in claim 9 wherein one of said threaded means is mounted for relative movement in said one direction with respect to said elongated guide means so that said elongated guide means is free to turn about its axis while said threaded nut means moves along said threaded spindle means.

11. A metal sheet cutting apparatus comprising, in combination, a pair of driven cooperating rotary cutting blade means for cutting and transporting a metal sheet in one direction; sheet holding means for holding in a working plane a metal sheet cut and transported by said rotary cutting blade means and being located rearwardly of said rotary cutting blade means in said one direction; an elongated guide means extending substantially in said one direction supporting said sheet holding means and guiding the same for movement in said one direction so that said rotary cutting blade means move said sheet holding means along said elongated guide means and toward said rotary cutting blade means when cutting and transporting a metal sheet held by said sheet holding means; supporting means turnably supporting said elongated guide means for turning movement in said working plane in opposite transverse directions transverse to said one direction and about an axis extending perpendicular to said working plane, said axis being located forwardly of said rotary cutting blade means in said one direction; and operating means including a threaded nut means turnably mounted on said elongated guide means rearwardly of said rotary cutting blade means in said one direction, and a threaded spindle means threadedly engaging said threaded nut means and extending transverse to said elongated guide means, said threaded spindle means being turnable for moving said elongated guide means in said opposite transverse directions to compensate for deviations of said rotary cutting blade means form a cutting line on a metal sheet held by said sheet holding means.

12. A metal sheet cutting apparatus comprising, in combination, a pair of driven cooperating rotary cutting blade means for cutting and transporting a metal sheet in one direction; sheet holding means for holding in a working plane a metal sheet cut and transported by said rotary cutting blade means; an elongated guide means extending substantially in said one direction supporting said sheet holding means and guiding the same for movement in said one direction so that said rotary cutting blade means move said sheet holding means along said elongated guide means when cutting and transporting a metal sheet held by said sheet holding means; supporting means turnably supporting said elongated guide means for turning movement in said working plane in opposite transverse directions transverse to said one direction and about an axis extending perpendicular to said working plane, said axis being located forwardly of said rotary cutting blade means in said one direction; operating means located rearwardly of said rotary cutting blade means in said one direction and engaging said elongated guide means for moving said elongated guide means in said opposite transverse directions to compensate for deviations of said rotary cutting blade means from a cutting line on a metal sheet held by said sheet holding means; reversible motor means for driving said operating means; and control means starting and stopping said motor means and for reversing the direction of rotation of said motor means so that said operating means move said elongated guide means in said opposite transverse directions in accordance with the direction of rotation of said motor means.

13. A metal sheet cutting apparatus comprising, in combination, a pair of driven cooperating rotary cutting blade means for cutting and transporting a metal sheet in one direction; sheet holding means for holding in a working plane a metal sheet cut and transported by said rotary cutting blade means and being located rearwardly of said rotary cutting blade means in said one direction; an elongated guide means extending substantially in said one direction supporting said sheet holding means and guiding the same for movement in said one direction so that said rotary cutting blade means move said sheet holding means along said elongated guide means and toward said rotary cutting blade means when cutting and transporting a metal sheet held by said sheet holding means; supporting means turnably supporting said elongated guide means for turning movement in said working plane in opposite transverse directions transverse to said one direction and about an axis extending perpendicular to said working plane, said axis being located forwardly of said rotary cutting blade means in said one direction; operating means located rearwardly of said rotary cutting blade means in said one direction and engaging said elongated guide means for moving said elongated guide means in said opposite transverse directions to compensate for deviations of said rotary cutting blade means from a cutting line on a metal sheet held by said sheet holding means; reversible motor means for driving said operating means; and control means starting and stopping said motor means and for reversing the direction of rotation of said motor means so that said operating means move said elongated guide means in said opposite transverse directions in accordance with the direction of rotation of said motor means.

14. An apparatus as claimed in claim 13 wherein said elongated guide means is turnable between an intermediate normal position extending in said one direction and two end positions angularly displaced in opposite directions from said intermediate normal position; and wherein said control means include automatic means actuated when said elongated guide means is in one of said end positions, said automatic means starting said motor means for rotation in a direction of rotation effecting movement of said elongated guide means out of either end position toward said normal position when said elongated guide means is turned into one of said end positions by the action of said cutting and transporting means acting on a sheet held by said sheet holding means.

15. A metal sheet cutting apparatus comprising, in combination, a pair of driven cooperating rotary cutting blade means for cutting and transporting a metal sheet in one direction; sheet holding means for holding in a working plane a metal sheet cut and transported by said rotary cutting blade means and being located rearwardly of said rotary cutting blade means in said one direction; an elongated guide means extending substantially in said one direction supporting said sheet holding means and guiding the same for movement in said one direction so that said rotary cutting blade means move said sheet holding means along said elongated guide means and toward said rotary cutting blade means when cutting and transporting a metal sheet held by said sheet holding means; ball means supported on the top face of said guide means for rolling movement and adapted to support a sheet held by said sheet holding means; supporting means turnably supporting said elongated guide means for turning movement in said working plane in opposite transverse directions transverse to said one direction and about an axis extending perpendicular to said working plane, said axis being located forwardly of said rotary cutting blade means in said one direction; and operating means including a threaded nut means turnably mounted on said elongated guide means rearwardly of said rotary cutting blade means in said one direction, and a threaded spindle means threadedly engaging said threaded nut means and extending transverse to said elongated guide means, said threaded spindle means being turnable for moving said elongated guide means in said opposite transverse directions to compensate for deviations of said rotary cutting blade means from a cutting line on a metal sheet held by said sheet holding means.

16. A sheet cutting apparatus comprising, in combination, an elongated beam including guide means extending in longitudinal direction thereof; supporting pivot means supporting said beam for turning movement about an axis and in a plane extending normal to said axis in opposite directions out of a normal position in which said guide means extend in one direction; sheet holding means mounted on said beam for movement along said guide means and being adapted to rigidly hold a sheet in said plane; cutting and transporting means located in the region of said beam for cutting and transporting in said one direction a sheet held by said sheet holding means whereby said sheet holding means is moved along said guide means; and operating means connected to said beam for moving the same in said opposite directions to compensate for deviations of said cutting and transporting means from a cutting line on a sheet held by said sheet holding means.

17. A sheet cutting apparatus comprising, in combination, an elongated beam including guide means extending in longitudinal direction thereof; rolling means supported on the top face of said beam for rolling movement; supporting pivot means supporting said beam for turning movement about an axis and in a plane extending normal to said axis in opposite directions out of a normal position in which said guide means extend in one direction; sheet holding means mounted on said beam for movement along said guide means and being adapted to rigidly hold in said plane a sheet supported in said rolling means; cutting and transporting means located adjacent said beam for cutting and transporting in said one direction and toward said pivot means a sheet held by said sheet holding means whereby said sheet holding means is moved along said guide means; and operating means connected to said beam for moving the same in said opposite directions to compensate for deviations of said cutting and transporting means from a cutting line on a sheet held by said sheet holding means.

18. A sheet cutting apparatus comprising, in combination, an elongated beam including guide means extending in longitudinal direction thereof; supporting pivot means supporting said beam at one end thereof for turning movement about an axis and in a plane extending normal to said axis in opposite direction out of a normal position in which said guide means extend in one direction; sheet holding means mounted on said beam for movement along said guide means and being adapted to rigidly hold a sheet in said plane; cutting and transporting means located adjacent said beam and intermediate said pivot means and said sheet holding means for cutting and transporting in said one direction and toward said pivot means a sheet held by said sheet holding means whereby said sheet holding means is moved along said guide means; and operating means connected to said beam in the region of the other end of the same for moving the same in said opposite directions to compensate for deviations of said cutting and transporting means from a cutting line on a sheet held by said sheet holding means.

19. A sheet cutting apparatus comprising, in combination, an elongated beam including guide means extending in longitudinal direction thereof; supporting pivot means supporting said beam at one end thereof for turning movement about an axis and in a plane extending normal to said axis in opposite directions out of a normal position in which said guide means extend in one direction; sheet holding means mounted on said beam for movement along said guide means and being adapted to rigidly hold a sheet in said plane; cutting and transporting means located adjacent said beam and intermediate said pivot means and said sheet holding means for cutting and transporting in said one direction and toward said pivot means a sheet held by said sheet holding means whereby said sheet holding means is moved along said guide means; a support supporting the other end of said beam for movement in said plane; and operating means connected to an end portion of said beam adjacent said other end of the same for moving said beam in said opposite directions to compensate for deviations of said cutting and transporting means from a cutting line on a sheet held by said sheet holding means.

20. A sheet cutting apparatus comprising, in combination, an elongated beam including guide means extending in longitudinal direction thereof; supporting pivot means supporting said beam at one end thereof for turning movement about an axis and in a plane extending normal to said axis in opposite directions out of a normal position in which said guide means extend in one direction; sheet holding means mounted on said beam for movement along said guide means and being adapted to rigidly hold a sheet in said plane; cutting and transporting means located adjacent said beam and intermediate said pivot means and said sheet holding means for cutting and transporting in said one direction and toward said pivot means a sheet held by said sheet holding means whereby said sheet holding means is moved along said guide means; a support supporting the other end of said beam for movement in said plane; operating means connected to an end portion of said beam adjacent said other end of the same for moving said beam in said opposite directions to compensate for deviations of said cutting and transporting means from a cutting line on a sheet held by said sheet holding means, said operating means including a reversible electric motor; and control means for starting, stopping and reversing said motor means and including a control member located adjacent said cutting and transporting means.

21. A sheet cutting apparatus comprising, in combination, an elongated beam including guide means extending in longitudinal direction thereof; supporting pivot means supporting said elongated beam for turning movement about an axis and in opposite transverse directions out of a normal intermediate position in which said guide means extend in one direction; sheet holding means mounted on said beam for movement along said guide means and being adapted to hold a sheet in a working plane normal to said axis; cutting and transporting means located adjacent said elongated beam for cutting along a cutting line extending in said one direction and for transporting in said one direction and toward said pivot means a sheet held by said sheet holding means; operating means connected to said elongated beam for moving the same in said opposite directions; motor means for driving said operating means; and a control means for said motor means, said control means including a circuit, a contact in said circuit and secured to the other end of said beam for movement therewith, and a pair of stationary contacts in said circuit and located on both sides of said movable contact and engaged by the same when said elongated beam is elastically displaced in transverse direction, said control means starting said motor means to drive said operating means in opposite directions when said movable contact engages one of said stationary contacts, respectively, whereby said elongated beam is returned to said normal position thereof.

22. A sheet cutting apparatus comprising, in combination, an elongated beam including guide means extending in longitudinal direction thereof; supporting pivot means supporting said elongated beam at one end thereof for turning movement about an axis and in opposite transverse directions out of a normal intermediate position in which said guide means extend in one direction; sheet holding means mounted on said beam for movement along said guide means and being adapted to hold a sheet in a working plane normal to said axis; cutting and transporting means located adjacent said elongated beam for cutting along a cutting line extending in said one direction and for transporting in said one direction and toward said pivot means a sheet held by said sheet holding means; operating means connected to the other end of said elongated beam for moving the same in said opposite directions; motor means for driving said operating means; and a control means for said motor means, said control means including a circuit, a source of light attached to said elongated beam at the other end of the same and adapted to emit a beam of light extending in said one direction, said beam of light being parallel to said cutting line when said elongated beam is in said normal intermediate position, a pair of photo-electric light-sensitive cells connected in said circuit and located in the region of said one end of said elongated beam spaced in said transverse direction so as to be located on both sides of said beam of light when said elongated beam is in said normal intermediate position, one of said cells, respectively, being energized by said beam of light when said elongated beam is displaced in transverse direction, each of said cells, when energized, actuating said control means to start said motor means for rotation in opposite directions to return said elongated beam to said intermediate normal position thereof.

23. A sheet cutting apparatus comprising, in combination, an elongated beam including guide means extending in longitudinal direction thereof; supporting pivot means supporting said elongated beam at one end thereof for turning movement about an axis and in opposite directions out of a normal intermediate position in which said guide means extend in one direction; sheet holding means mounted on said beam for movement along said guide means and being adapted to hold a sheet in a working plane normal to said axis; cutting and transporting means located adjacent said elongated beam for cutting along a cutting line extending in said one direction and for transporting in said one direction and toward said pivot means a sheet held by said sheet holding means; operating means connected to the other end of said elongated beam for moving the same in said opposite directions; motor means for driving said operating means; and a control means for said motor means, said control means including a circuit, a pair of photo-electric sensing devices spaced in transverse direction and adapted to be located in both sides of said cutting line when said elongated beam is in said intermediate normal position, each of said photo-electric sensing devices including a light-sensitive cell arranged and adapted to be energized by light reflected from a line marked on the sheet in the direction of said cutting line when said elongated beam is displaced in transverse direction, each of said photo-electric sensing devices, when energized, actuating said control means to start said motor means for rotation in opposite directions to return said elongated beam to said normal position thereof.

24. A sheet cutting apparatus comprising, in combination, an elongated beam including guide means extending in longitudinal direction thereof; supporting pivot means supporting said elongated beam for turning movement about an axis and in opposite directions out of a normal intermediate position in which said guide means extend in one direction; sheet holding means mounted on said beam for movement along said guide means and being adapted to hold a sheet in a working plane normal to said axis; cutting and transporting means located adjacent said elongated beam for cutting along a cutting line extending in said one direction and for transporting in said one direction and toward said pivot means a sheet held by said sheet holding means; operating means connected to said elongated beam for moving the same in said opposite directions; motor means for driving said operating means; and a control means for said motor means, said control means including a circuit, and automatic actuating means connected in said circuit and having an operative condition and an inoperative condition, said automatic actuating means being placed in said operative condition when said elongated beam moves out of said intermediate normal position thereof and being in said inoperative condition when said elongated beam is in said intermediate normal position, said actuating means in said operative condition actuating said control means to start said motor means to drive said operating means in opposite directions to return said elongated beam to said intermediate normal position thereof.

References Cited in the file of this patent

UNITED STATES PATENTS

| | | | |
|---|---|---|---|
| 1,313,960 | Smith | Aug. 26, | 1919 |
| 1,835,328 | Parsons | Dec. 8, | 1931 |
| 1,860,340 | Biggert | May 24, | 1932 |
| 2,356,300 | Boettcher | Aug. 22, | 1944 |
| 2,606,614 | Piper | Aug. 12, | 1952 |
| 2,706,001 | Wilder | Apr. 12, | 1955 |